(12) United States Patent
Kopf (10) Patent No.: US 11,201,450 B2
(45) Date of Patent: Dec. 14, 2021

(54) Q-SWITCHED SOLID-STATE LASER (71) Applicant: Daniel Kopf, Röthis (AT)

(72) Inventor: Daniel Kopf, Röthis (AT)

(*) Notice: Subject to any disclaimer, the term of this patent is extended or adjusted under 35 U.S.C. 154(b) by 39 days.

(21) Appl. No.: 16/711,878

(22) Filed: Dec. 12, 2019

(65) Prior Publication Data
US 2020/0194960 A1 Jun. 18, 2020

(30) Foreign Application Priority Data

Dec. 14, 2018 (AT) .................................. A 372/2018

(51) Int. Cl.
| | |
|---|---|
| *H01S 3/115* | (2006.01) |
| *H01S 3/0941* | (2006.01) |
| *H01S 3/08* | (2006.01) |
| *H01S 3/113* | (2006.01) |
| *H01S 3/081* | (2006.01) |
| *H01S 3/083* | (2006.01) |
| H01S 3/16 | (2006.01) |
| H01S 3/06 | (2006.01) |

(52) U.S. Cl.
CPC .............. *H01S 3/115* (2013.01); *H01S 3/083* (2013.01); *H01S 3/0818* (2013.01); *H01S 3/08031* (2013.01); *H01S 3/08081* (2013.01); *H01S 3/0941* (2013.01); *H01S 3/113* (2013.01); *H01S 3/0606* (2013.01); *H01S 3/0815* (2013.01); *H01S 3/08063* (2013.01); *H01S 3/08072* (2013.01); *H01S 3/1611* (2013.01); *H01S 3/1643* (2013.01)

(58) Field of Classification Search
CPC ............... H01S 3/08081; H01S 3/0818; H01S 3/08031; H01S 3/113; H01S 3/1124–127
See application file for complete search history.

(56) References Cited

U.S. PATENT DOCUMENTS

| | | |
|---|---|---|
| 5,701,319 A | 12/1997 | Fermann |
| 7,664,148 B2 | 2/2010 | Sakai et al. |
| 9,124,064 B2 | 9/2015 | Kopf |

(Continued)

FOREIGN PATENT DOCUMENTS

| | | |
|---|---|---|
| CA | 1164990 | 4/1984 |
| CN | 1328831 | 7/2007 |

(Continued)

OTHER PUBLICATIONS

Bhandari, Rakesh et al., "Palm-top size megawatt peak power ultraviolet microlaser", Optical Engineering, 7 pages, vol. 52(7), Jul. 2013.

(Continued)

*Primary Examiner* — Tod T Van Roy
(74) *Attorney, Agent, or Firm* — Volpe Koenig (57) ABSTRACT

In a Q-switched solid-state laser having a resonator (3, 30) in the form of a linear resonator or a ring resonator having an active laser material (1) and at least one first and one second mirror (4, 5) and a resonator length (a) of less than 50 mm, preferably less than 25 mm, in the case of the configuration as a linear resonator and of less than 100 mm, preferably less than 50 mm, in the case of the configuration as a ring resonator, at least substantially only one longitudinal mode oscillates in the resonator (3). The resonator (3, 30) is in the form of an unstable resonator, with one of the mirrors (4, 5) being a gradient mirror.

15 Claims, 3 Drawing Sheets

(56) References Cited

U.S. PATENT DOCUMENTS

| | | |
|---|---|---|
| 2003/0021324 A1 | 1/2003 | Filgas |
| 2005/0163170 A1 | 7/2005 | Okhotnikov |
| 2008/0225903 A1* | 9/2008 | Nettleton ............... H01S 3/025 372/10 |
| 2010/0296527 A1 | 11/2010 | Nicholson |
| 2010/0296529 A1 | 11/2010 | Andersen |
| 2012/0026504 A1 | 2/2012 | Yamada |
| 2012/0036504 A1 | 2/2012 | Yamada |
| 2013/0064262 A1 | 3/2013 | Kopf |
| 2013/0083814 A1 | 4/2013 | Nodop et al. |
| 2015/0244141 A1 | 8/2015 | Kopf |
| 2017/0117681 A1 | 4/2017 | Kopf |
| 2017/0133815 A1 | 5/2017 | Kopf |
| 2017/0212239 A1* | 7/2017 | Stysley ............... H01S 3/08063 |
| 2018/0309261 A1 | 10/2018 | Taira et al. |
| 2020/0194960 A1 | 6/2020 | Kopf |

FOREIGN PATENT DOCUMENTS

| | | |
|---|---|---|
| CN | 104158082 | 11/2014 |
| CN | 105390917 | 3/2016 |
| DE | 102010021262 | 10/2011 |
| WO | 2011147799 | 12/2011 |
| WO | 2014019003 | 2/2014 |
| WO | 2015021488 | 2/2015 |
| WO | 2015135011 | 9/2015 |
| WO | 2016004446 | 1/2016 |

OTHER PUBLICATIONS

Lee, Hee Chul et al., High-energy, sub-nanosecond linearly polarized passively Q-switched MOPA laser system, Optics and Laser Technology, pp. 81-85, 2017.

Mehner, E. et al., "Sub-20-ps pulses from a passively Q-switched microchip laser at 1 MHz repetition rate", Optics Letters, vol. 39, No. 10, pp. 2940-2943, May 15, 2014.

Turkyilmaz, Erdal et al., "Simple ps microchip Nd:YVO4 laser with 3.3-ps pulses at 0.2 to 1.4 MHz and single-stage amplification to the microjoule level", Optical Engineering, vol. 55(6), 066126-1 to -6, Jun. 2016.

Steinmetz, A. et al., Sub-5-ps, multimegawatt peak power pulses from a fiber-amplified and optically compressed passively Q-switched microchip laser, Optics Letters, vol. 37, No. 13, pp. 2550-2552, Jul. 1, 2012.

Lehneis, R. et al. "All-fiber pulse shortening of passively Q-switched microchip laser pulses down to sub-200 fs", Optics Letters, vol. 39, No. 20, pp. 5806-5809, Oct. 15, 2014.

Sakai, H et al., "1 MW peak power single-mode high-brightness passively A-switched Nd3+: YAG microchip laser", Optics Express, vol. 16, No. 24, p. 19891-19899, Nov. 24, 2008.

Hayashi, Shin'ichiro et al., "Tunability enhancement of a terahertz-wave parametric generator pumped by a microchip Nd: YAG laser", Applied Optics, vol. 48, No. 15, pp. 2899-2902, May 20, 2009.

Braun, B et al., "56-ps passively Q-switched diode-pumped microchip laser", Optics Letters, vol. 22, No. 6, 3 pages, Mar. 15, 1997.

Stafsudd, O.M. et al., CO2 laser with simultaneous active and passive Q-switching, Applied Optics, vol. 10, No. 1, pp. 141-143, Jan. 1971.

RP Photonics Encyclopedia, Unstable Resonators, 4 pages, https://www.rp-photonics.com/unstable_resonators_html, Sep. 11, 2018.

RP Photonics Encyclopedia, Quasi-continuous-wave Operation, 2 pages, https://www.rp-photonics.com/quasi_continuous_wave_operation_html, Sep. 11, 2018.

RP Photonics Encyclopedia, Single-mode Operation, 2 pages, https://www.rp-photonics.com/single_mode_operation_html, Sep. 11, 2018.

Encyclopedia of Laser Physics and Technology—YAG lasers, "Other Laser-active Dopants in YAG", https://www.rp-photonics.com/yag_lasers.html, 2 pages, Aug. 29, 2018.

RP Photonics Encyclopedia, Alignment Sensitivity, 3 pages, https://www.rp-photonics.com/alignment_sensitivity_html, Aug. 29, 2018.

Wang, Zeujun et al. "Single-longitudinal-mode Operation of 1 W combined actively and passively Q-switched Cr,Nd: YAGLaser", Optics Express, 6697 vol. 13, No. 18, pp. 6693-6698, https://doi.org/10.1364/OPEX.13.006693, Sep. 5, 2005.

Kohl, Hagen et al. "12-ps megawatt peak power pulses out of a single laser oscillator with nonlinear pulse compression:", Nuremberg Institute of Technology, Solid State Lasers XXVIII: Technology and Devices, vol. 10896, 9 pages, 2019.

Mok, et al., "Soliton compression and pulse-train generation by use of microchip Q-switched pulses in Bragg gratings", Optics Letters, vol. 30, No. 18, pp. 2457-2460, Sep. 15, 2005.

Duron, F., et al., "High-repetition-rate 300-ps pulsed ultraviolet source with a passively Q-switched microchip laser and a multipass amplifier", Optics Letters, vol. 24, No. 7, pp. 499-502, Apr. 1, 1999.

Arvidsson, Magnus et al., "Combined actively and passively Q-switched microchip laser", SPIE—International Society for Optical Engineering, Proceedings, vol. 3265, p. 106, May 27, 1998.

Peng Zhu et al., "High Efficiency 165 W near-diffraction-limited N: YV04 slab oscillator pumped at 880 nm", Optics Letters, Optical Society of America, US, vol. 33, No. 17, pp. 1930-1932, Sep. 1, 2008.

Omatsu T et al., "Passive Q-switching of a diode-side-pumped Nd doped 1.3@mm ceramic YAG bounce laser", Optics Communications, Elsevier, Amsterdam, NL, vol. 282, No. 24, pp. 4784-4788, Dec. 15, 2009.

Wang X et al, "Timing Jitter Reduction and Single-Frequency Operation in an Acousto-Optic Q-Switched CR, NS: YAG Laser", Applied Optics, Optical Society of America, Washington, DE, US, vol. 45, No. 33, pp. 8477-8483, Nov. 20, 2006.

Limpert, Jens et al., "High-pulse-energy passively Q-switched quasi-monolithic microchip lasers operating in the sub-100-ps pulse regime", Optical Letters, vol. 32, Nr. 15, pp. 2115-2117, downloaded Dec. 18, 2019, https://www.researchgate.net/Publication/6166856_High-pulse-energy_passively_Q-switched_quasi-monolithc_microchip_lasers_operating_in_the_sub-100-ps_pulse_regime>, Aug. 1, 2007.

* cited by examiner

Q-SWITCHED SOLID-STATE LASER

INCORPORATION BY REFERENCE

The following documents are incorporated herein by reference as if fully set forth: Austrian Patent Application No. A372/2018, filed Dec. 14, 2018.

TECHNICAL FIELD

The invention relates to a Q-switched solid-state laser having a resonator in the form of a linear resonator or a ring resonator having an active laser material and at least one first and one second mirror and a resonator length of less than 50 mm, preferably less than 25 mm, in the case of the configuration as a linear resonator and of less than 100 mm, preferably less than 50 mm, in the case of the configuration as a ring resonator, with at least substantially only one longitudinal mode oscillating in the resonator.

BACKGROUND

Such a laser is known for example from Bhandari R. and Taira T., "Palm-top size megawatt peak power ultraviolet microlaser," Optical Engineering, July 2013/Vol. 52(7), 076102-1-076102-6. The active laser material used is Nd:YAG, and an absorber that is made from a doped solid-state material in the form of Cr:YAG is used as a passive Q-switch. At a length of the resonator of 10 mm, a "free spectral range" is obtained, that is to say a distance between the wavelengths of possible adjacent longitudinal modes that is so great that only one of the longitudinal modes lies in the gain maximum such that it oscillates. A high pulse energy of 3 mJ with a pulse width of 230 ps and a repetition rate of 100 Hz is obtained with that laser. The wavelength of the laser is 1064 nm. This document mentions further documents relating to Nd:YAG/Cr:YAG lasers with high pulse energy. The design of the resonators in each case is such that they are optically stable ("stable resonator"). The design of the resonator can be monolithic, wherein both end mirrors are plane mirrors and a thermal lens having a converging effect is formed by the active laser material during operation. The maximum attainable pulse energy is limited by the size of the radius of the laser beam that is attainable in practical operation, because, although a theoretical solution exists for larger mode radii, the tilt sensitivity of the optical elements of the resonator and the sensitivity to changes of the thermal lens no longer make a robust product possible. The result is optical destruction at the coatings or in the bulk of the active laser material or of the absorber or at the transition layer.

Q-switched solid-state lasers with "single longitudinal mode" operation and by comparison much smaller pulse energies in the region of a few 10 nJ are known in the form of very small monolithic microchip lasers with Nd:YVO4 as the active laser material, cf. e.g. WO 2016/004446 A1. The resonator lengths can here be less than 150 μm and pulse lengths of less than 100 ps can be attained. These resonators are also stable with planar end mirrors and the formation of a thermal lens during operation.

Lee H. C. et al., "High energy, sub-nanosecond linearly polarized passively Q-switched MOPA laser system," Optics and Laser Technology 95 (2017) 81-85, disclose a Q-switched Nd:YAG/Cr:YAG laser with a stable resonator, the output pulses of which, having a pulse energy of approximately 2.5 mJ and a pulse duration of approximately 550 ps, are post-amplified. The active laser material and the absorber here have, on their mutually facing sides, faces that are oppositely arranged at the Brewster angle so as to effect a polarization selection of the laser beam.

SUMMARY

Is the object of the invention to provide an advantageous Q-switched solid-state laser of the type mentioned in the introductory part that is operable at particularly high pulse energies. This is accomplished by way of a laser having one or more features according to the invention.

In the laser according to the invention, the resonator is in the form of an unstable resonator, wherein one of the mirrors of the resonator is a gradient mirror. The resonator length is here less than 50 mm, preferably less than 25 mm, if the resonator is in the form of a linear resonator (also referred to as a "standing wave resonator"), and less than 100 mm, preferably less than 50 mm, if the resonator is in the form of a ring resonator. If the resonator is in the form of a linear resonator, the resonator length is the length of the axis of the laser beam measured along said axis from one end mirror to the other end mirror. If the resonator is in the form of a ring resonator, the resonator length is the length of the axis of the laser beam, measured along the axis of the laser beam, through one round-trip through the resonator.

The use of a resonator that is so short and adapted in terms of its length such that only a single longitudinal mode oscillates, in connection with an optically unstable resonator, makes it possible to obtain a "smooth" pulse curve at very high pulse energies. In order to allow very high pulse energies despite the short length of the unstable resonator, the latter advantageously has at least one optical element with a relatively great negative refractive power to obtain a large beam radius of the laser mode. Nevertheless, stable operation with low sensitivity with respect to tilting of the elements and the operating parameters is made possible here. The resonator advantageously has a total refractive power that is less than −2 dpt, i.e. the refractive power is negative and its absolute value is greater than 2. The total refractive power is advantageously less than −4 dpt. If the resonator is in the form of a linear resonator (also referred to as "standing wave resonator"), the total refractive power of the resonator is obtained from the sum of the refractive powers of the individual optical elements of the resonator, wherein the refractive powers of the individual optical elements are added up over the path from the first end mirror to the second end mirror and the return path from the second end mirror to the first end mirror. The refractive powers of the end mirrors are here included only once, while optical elements arranged in the resonator between the end mirrors, that is to say including the thermal lens formed by the active laser material during operation, and the refractive powers thereof are included twice. If the resonator is in the form of a ring resonator, the refractive powers of the optical elements over one round-trip in the resonator are added up, that is to say the refractive powers of all optical elements of the resonator are included once.

A laser according to the invention can have pulse energies of more than 1 mJ. Pulse energies of more than 5 mJ, preferably more than 10 mJ are also possible. Even higher pulse energies of more than 50 mJ are advantageously attainable in particular in the case of side-pumping of the active laser material.

The pulse duration is advantageously shorter than 20 ns, preferably shorter than 10 ns. Pulse durations of less than 1 ns are also possible.

Known Q-switched solid-state lasers with optically unstable resonators have considerably greater resonator lengths with a multiplicity of longitudinal modes. In the optical elements used, which have a negative refractive power, the absolute value thereof is relatively low. In such known lasers, with a tilt sensitivity of the optical elements of the resonator that is relatively low—as compared to lasers with stable resonators—and insensitivity to changes in the thermal lens, high pulse energies can be obtained. The intensity curve of the emitted pulses, however, exhibits oscillations and spikes owing to the superposition of the different modes. Such lasers having an unstable resonator are mentioned, for example, in WO 2014/019003 A1, EP 3 117 494 A1 or WO 2015/021488 A1.

For Q-switching, the laser according to the invention preferably has a passive Q switch, in particular a doped solid-state material.

Nd:YAG is particularly suitable as an active laser material of a laser according to the invention due to its high gain. In this case, Cr:YAG can be advantageously used as an absorber for passive Q-switching.

In one possible embodiment of the invention, total internal reflection of the laser beam on a side face of the active laser material, through which the pump radiation is also injected, takes place. A phase shift between the s-polarization and p-polarization of the laser beam takes place here. The laser can in this case be tuned with its gain maximum such that, for one of the mutually phase-shifted s-polarization and p-polarization, exactly one longitudinal mode lies at the gain maximum of the laser, and, for the other one of said polarizations, the longitudinal mode that is closest to the gain maximum is also shifted with respect to the gain maximum to an extent such that the oscillation thereof is at least substantially prevented (that is to say the energy thereof is less than 10%, preferably less than 1%, as compared to the mode with the selected polarization, in particular is completely prevented, that is to say the laser threshold is not exceeded). In this way, selection of the polarization of the emitted laser beam is achieved easily without additional optical elements.

Due to the configuration according to the invention, it is made possible that the mode is substantially determined by the optical design of the resonator, including the gradient mirror, while the effect of the thermal lens can be at least substantially neglected. In this way, stable operation over a wide pump power range or pulse repetition rate range, for example from single shot to maximum repetition rate (e.g. 100 Hz or 1000 Hz), is made possible. "Pulse-on-demand" operation is also advantageously possible, which is significant for many applications. By comparison, conventional lasers having very short stable resonators, for example in accordance with the prior art mentioned in the introductory part, exhibit great dependence on the thermal lens and thus on the pulse repetition rate.

BRIEF DESCRIPTION OF THE DRAWINGS

Further advantages and details of the invention will be explained below with reference to the attached drawing. In this drawing.

DETAILED DESCRIPTION

Figure 1:
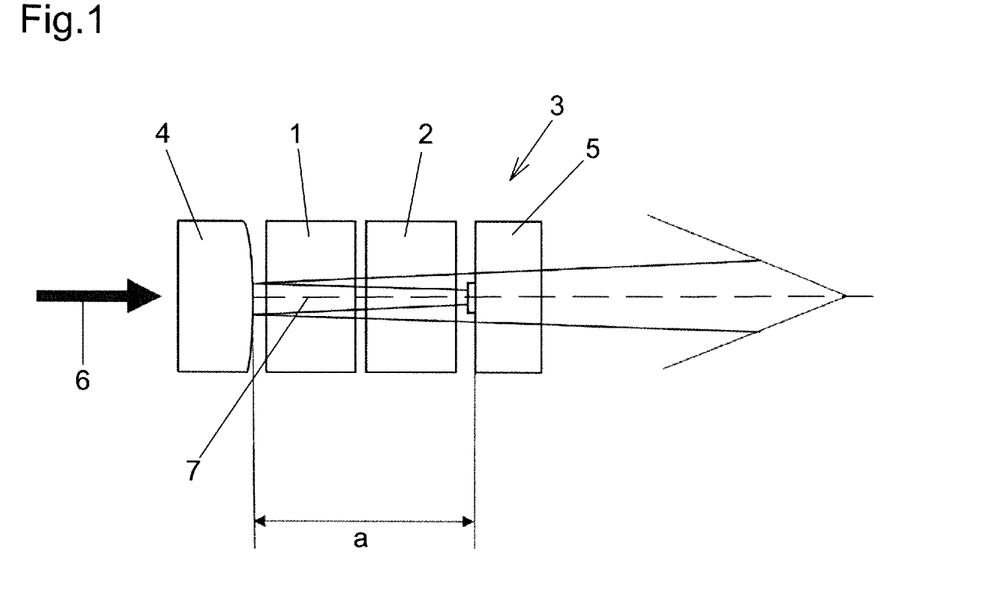
FIG. 1 shows a schematic illustration of a laser according to a first exemplary embodiment of the invention.

A first exemplary embodiment of the invention is schematically illustrated in FIG. 1. It involves a solid-state laser having an active laser material 1, formed by Nd:YAG. The doping can constitute for example 1.1%.

The laser is passively Q-switched. In particular, a doped solid-state material, in the exemplary embodiment Cr:YAG (more specifically $Cr^{4+}$:YAG), serves as an absorber 2. FIG. 1 illustrates the active laser material 1 and the absorber 2 separated by a gap. However, these two elements are preferably connected to form a unit, for example they are bonded together by diffusion bonding at the respectively polished surface. When using ceramic Nd:YAG/Cr:YAG, the bonded unit (sandwich structure) can already be created in powdered form before the sintering operation.

The active laser material 1 and the absorber 2 are arranged between a first and a second mirror 4, 5 forming the end mirrors of the resonator 3. The resonator 3 thus comprises the mirrors 4, 5, the active laser material 1, and the absorber 2.

In the exemplary embodiment, the first mirror 4 also serves to couple in the pump radiation 6 indicated only schematically in FIG. 1 by way of an arrow. To this end, the first mirror 4 has a dichroic coating, wherein it is at least largely transmissive (T>95%) for the pump radiation 6, while it is as reflective as possible (R>99.9%) and correspondingly not very transmissive for the wavelength of the laser beam.

For example, the wavelength of the pump radiation is 808 nm.

The wavelength of the laser light in the exemplary embodiment is 1064 nm.

The device for pumping itself is not illustrated in FIG. 1. Said device can be a conventional fiber-coupled laser diode with a QCW ("quasi continuous wave") power of for example up to 150 W (for pulse durations of 250 μs), which is operated with a pulse repetition rate in the range of 0-100 Hz. The beam diameter of the pump radiation can be for example approximately 2.5 mm.

The second mirror 5 is a gradient mirror ("gradient reflectivity mirror"; also referred to as "variable reflectivity mirror"). Such gradient mirrors are known. The central reflectivity of the gradient mirror can expediently range from 30% to 60%, for example can be 40%. The radius at which the reflectivity of the gradient mirror drops to $e^{-2}$ can expediently range from 1 mm to 2 mm, e.g. can be 1.5 mm.

The reflectivity curve of the gradient mirror (=reflectivity as a function of the radius) can in particular have the shape of a Gaussian curve or of a super-Gaussian curve.

The resonator 3 is a linear resonator, or standing wave resonator. The term "linear resonator" also comprises resonators in which the beam profile in the resonator is bent by at least one reflection within the cavity of the resonator, that is to say the term also includes folded resonators. Another operating principle, by contrast, is the ring resonator, in which radiation circulates. The structural length of the resonator from mirror 4 to mirror 5 in this exemplary embodiment corresponds to the length measured along the axis 7 of the laser beam in the resonator (=resonator length a) from one mirror 4 to the other mirror 5. This resonator length a is less than 50 mm, preferably less than 25 mm, and in the exemplary embodiment 10 mm. If the laser beam were to be reflected in the resonator (as in the exemplary embodiments according to FIGS. 3 to 5, for example), the resonator length a used would have to be the "unfolded" length of the resonator, that is to say again the length of the resonator measured along the axis of the laser beam from one mirror to the other mirror.

The first mirror 4 is configured to be an optical element having a negative refractive power. The focal length thus has a negative value, with the absolute value of the focus length being less than 500 mm, preferably less than 250 mm, with particular preference less than 150 mm. In the exemplary embodiment, the focal length is −50 mm. A beam that is incident on the first mirror 4 is thus reflected with a high divergence.

The resonator 3 is thus optically unstable. The magnification of the resonator is here >1.2, and in the exemplary embodiment it is approximately 2. The magnification is a measure of the geometric expansion of the circulating beams in the unstable resonator, i.e. if M=2, the rays of the eigenmode of the unstable resonator during one round-trip are further removed from the axis by the factor 2.

The total refractive power of the resonator (=the added-up refractive powers of the optical elements for the path in one direction and the return path through the resonator 3, with each of the mirrors 4, 5 being included only once) in this exemplary embodiment substantially corresponds to the refractive power of the first mirror 4, because the refractive power of the thermal lens formed by the active laser material 1 during operation is, by comparison, significantly lower. In the exemplary embodiment, the total refractive power of the resonator is thus approximately −20 dpt.

The resonator 3 is tuned in terms of its length a such that a longitudinal mode of the laser radiation lies exactly at the gain maximum of the active laser material 1, in the exemplary embodiment at 1064 nm. To this end, the laser is expediently also stabilized in terms of temperature. Owing to the short length of the resonator 3, the "free spectral range" is so great that the adjacent longitudinal modes are located so far outside the gain maximum that they at least substantially do not oscillate (that is to say their energy is less than 10% of that of the fundamental mode), in particular do not oscillate at all (i.e. the laser threshold is not exceeded). The width of the gain maximum of the active laser material is to this end also correspondingly small. In other words, the laser has at least substantially only one longitudinal mode during operation. The laser during operation also has at least substantially only one transverse mode. Owing to the configuration as an unstable resonator, higher-order transverse modes at least substantially do not oscillate. In other words, the laser is a "single-mode" laser both in terms of transverse and in terms of longitudinal modes.

Owing to the configuration with a negative refractive power having a large absolute value, it is possible here to obtain a large mode size despite the short length of the laser. The beam radius of the laser beam in the active laser material 1 is expediently greater than 500 μm. It is possible thereby to obtain a high pulse energy without optical destruction occurring. The pulse energy is preferably more than 10 mJ.

The use of Cr:YAG as a saturable absorber can have a stabilizing effect. The absorber initially becomes saturated at the locations of the antinodes of the main mode (="hole burning"). This causes higher absorption for side modes, because the side modes will increasingly have their antinodes in an unsaturated region.

The transmission of the unsaturated absorber can lie in a very large range, for example in the range from 10% to 85%.

The entry and exit faces of the active laser material 1 and the absorber 2 are advantageously provided with an antireflective coating for the wavelength of the laser beam.

Figure 2:
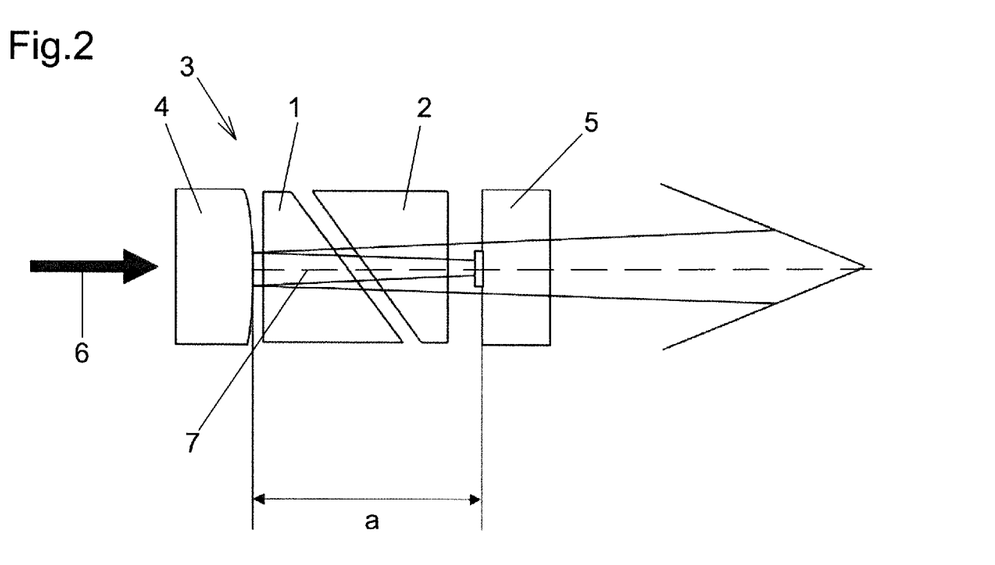
FIG. 2 shows a second exemplary embodiment according to the invention.

A second exemplary embodiment of the invention is illustrated in FIG. 2. Aside from the differences that will be described below, the construction corresponds to that of the first exemplary embodiment, and the description of the first exemplary embodiment can to this extent be used analogously.

In this exemplary embodiment, the active laser material 1 and the absorber 2 are in each case cut and polished in what is known as a "flat/Brewster" configuration. The active laser material 1 and the absorber 2 thus in each case have a Brewster angle on their sides that face one another, wherein said sides are at least substantially parallel to one another, and the opposite sides are at a right angle with respect to the axis 7 of the laser beam. The flat side is expediently coated again with an anti-reflective coating for the laser wavelength (possibly also for the wavelength of the pump radiation). The Brewster faces are not necessarily coated. The two Brewster faces transmit the p-polarization unhindered, but result in a loss for s-polarization. The necessary result is that the resonator runs in p-polarization, with the result that it at least substantially cannot oscillate (that is to say the energy is less than 10%, preferably 1%, of that of the fundamental mode of the p-polarization), in particular cannot oscillate at all (i.e. the laser threshold is not exceeded).

In order to avoid an etalon effect for the s-polarization, which could reduce or eliminate the losses for the s-polarization, the distance between the two Brewster faces must be selected precisely, such that no high transmission of the s-polarization occurs for the wavelengths of those s-polarized modes that are close to the gain maximum of the active laser material 1. Instead, or additionally, a mutual slight tilt of the Brewster faces may also be provided.

The active laser material 1 and the absorber 2 can also have a monolithic design in this embodiment variant, wherein in that case, a dielectric coating should be provided between the Brewster faces (similar to the known "polarizing cubes").

Figure 3:
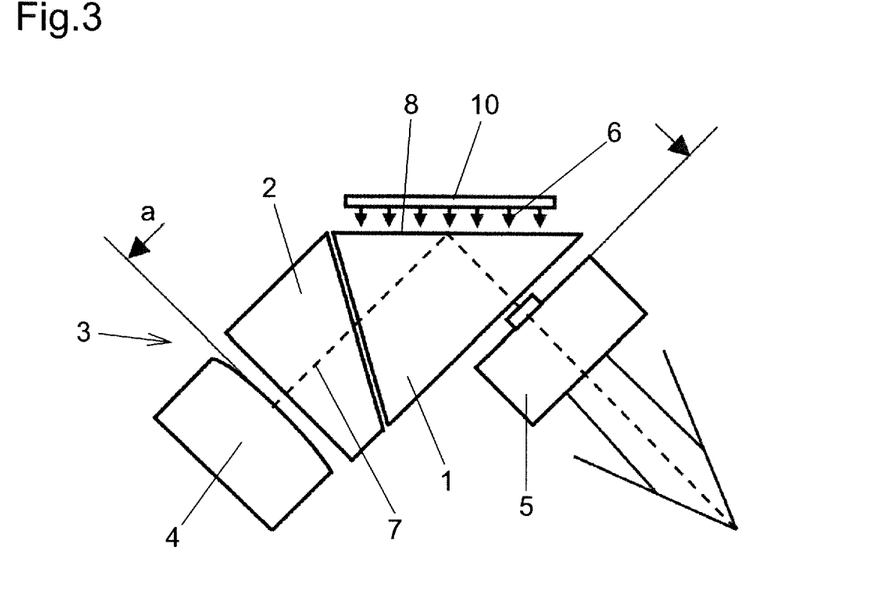
FIG. 3 shows a third exemplary embodiment according to the invention.

A third exemplary embodiment of the invention is illustrated in FIG. 3. Aside from the differences that will be described below, the construction corresponds to that of the second exemplary embodiment, and the description of the second exemplary embodiment can be used analogously.

The fiber-coupled laser diode modules used as pump sources in connection with the first and second exemplary embodiments have a limited power and are relatively expensive for the power they provide. In order to increase the power at lower costs and less complexity, QCW laser diode stacks are used in this exemplary embodiment as a source of the pump radiation. Configurations in which a plurality of laser diode bars, for example having a width of 1 cm, are combined to form a laser diode module of high power that is operated in QCW ("quasi continuous wave") are known. It is also known in this context to directly bond the bars one on top of another, such that the distance between the bars is small, for example 140 μm. A stack having 10 bars can thus emit on a face of 10 mm×1.4 mm, wherein the radiation angle in the x-direction is approximately +/−5° and that in the y-direction is approximately +/−25°, as long as no optical unit is used.

A significant difference from the previously described exemplary embodiments is that the active laser material in this exemplary embodiment is side-pumped (that is to say through a face that is oriented at an angle with respect to the axis of the laser beam). To this end, an afore-described stack 10, which is illustrated schematically in FIG. 3, can be used, with which the pump radiation 6 is directly injected into the active laser material 1.

The laser beam in the active laser material 1 is here reflected by way of total internal reflection at said side face 8, through which the pump radiation 6 is injected.

An angle of incidence of the laser beam of 45° is particularly preferred, with the result that the axis 7 of the laser beam is angled at 90°. Such an angle of incidence and p-polarization produce the effect that the incident and reflected beam do not interfere with one another because their E-field vectors are perpendicular to one another. As a result, the incident and reflected beams per se do not cause any spatial hole burning in the excited active laser material 1, which increases the mode stability and efficiency. Otherwise, SHB ("spatial hole burning") could significantly increase the gain of the side modes.

In order to force the desired p-polarization, the active laser material 1 and the absorber 2 can each have, as illustrated, a Brewster face, similar to the exemplary embodiment described above.

The length measured along the axis 7 of the laser beam (=resonator length a) of the resonator 3 from the first mirror 4 to the second mirror 5 (=unfolded length of the resonator) can in this exemplary embodiment be 15 mm, for example. This resonator length a is indicated in FIG. 3 by way of dimensioning lines and arrows that are oriented at angles with respect to one another.

A previously described laser diode stack can output for example 2000 W for 250 μs, corresponding to a pump energy of 500 mJ. It is thus possible to obtain an energy of the laser pulse in the region of 100 mJ.

In order to attain a sufficient expansion of the pump radiation in the y-direction, the air distance between the laser diode stack and the entry face into the active laser material 1 can range for example from 2 to 3 mm.

The entire negative refractive power of the resonator 3 is designed such that it produces a sufficiently large mode radius of the laser radiation. The focal length of the first mirror 4 expediently lies in the region of −75 mm. This gives a magnification of approximately 2. The mode radius of the laser radiation upon incidence on the second mirror 5 can lie in the region of 3.5 mm. The gradient mirror has a corresponding design. The radius at which the reflectivity of the gradient mirror drops to $e^{-2}$ can here lie in the region of 1.75 mm.

The polarization selection can additionally be assisted by a phase shift between the s-polarization and the p-polarization in the case of the total internal reflection at the surface of the active laser material 1. The unfolded length of the resonator 3 can here be set by way of fine adjustment such that a longitudinal mode lies in the gain maximum of the active laser material 1 for only one of the two polarizations, while the longitudinal modes for the other polarization by contrast are shifted to an extent such that they at least substantially do not oscillate (i.e. the energy is less than 10%, preferably less than 1%, of that of the fundamental mode with the polarization that produces a location in the gain maximum), in particular do not oscillate at all (i.e. the laser threshold is not exceeded). Such fine adjustment of the resonator length can be accomplished for example by setting the temperature of the base plate on which the laser is mounted.

The phase difference between the s-polarization and p-polarization caused by the total internal reflection is approximately 116° for an angle of incidence of 45°. Also conceivable would be a coating of said side face 8 to cause a targeted phase difference, for example of 90°. This coating would have to be transmissive for the wavelength of the pump radiation.

Figure 4:
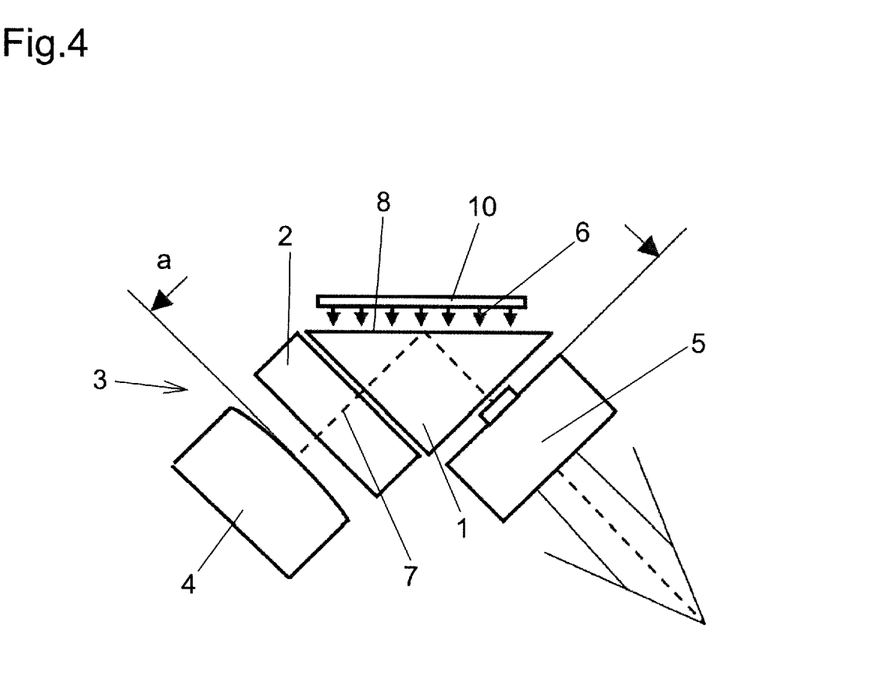
FIG. 4 shows a fourth exemplary embodiment according to the invention.

FIG. 4 shows a fourth exemplary embodiment of the invention. Aside from the differences that will be described below, the configuration corresponds to that of the third exemplary embodiment. For the remainder, the description of the third exemplary embodiment can be used analogously.

The difference to the third exemplary embodiment is substantially that the Brewster faces of the active laser material 1 and of the absorber 2 have been dispensed with. The polarization selection is achieved here only on account of the phase difference between the s-polarization and the p-polarization of the laser radiation that is caused by the total internal reflection.

In this exemplary embodiment, bonding of the active laser material 1 and of the absorber 2 without an interconnected dielectric layer is possible.

Figure 5:
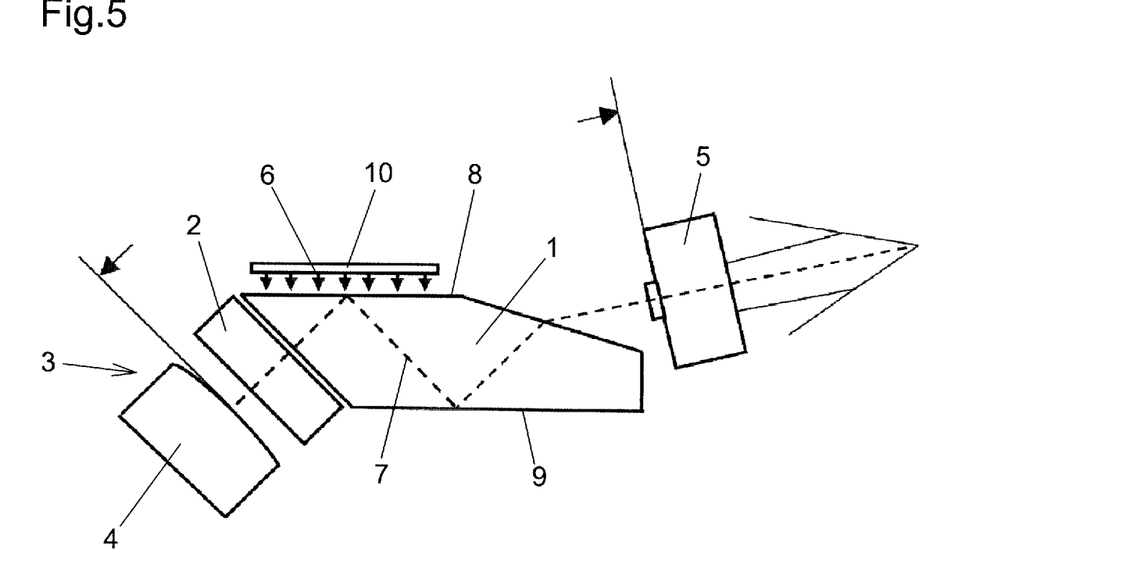
FIG. 5 shows a fifth exemplary embodiment according to the invention.

FIG. 5 shows a fifth exemplary embodiment of the invention. Aside from the differences that will be described below, the configuration corresponds to that of the fourth exemplary embodiment. For the remainder, the description of the fourth exemplary embodiment can be used analogously.

In this exemplary embodiment, the active laser material 1 has a different shape from the fourth exemplary embodiment, specifically it is longer, with the result that two total internal reflections occur. When the laser beam enters the active laser material 1 starting from the first mirror 4 (after passage through the absorber 2), first one total internal reflection occurs at the side face 8, through which the pump radiation is injected. A further total internal reflection takes place at the opposite side face 9. Thereafter, the laser beam exits an end face of the active laser material 1, which preferably exhibits a Brewster angle, and from there passes to the second mirror 5. The angles in the axis 7 of the laser beam for the two total internal reflections are preferably 90° each. However, other angles are likewise conceivable and possible in principle.

The active laser material that is configured in this way can be mounted easily onto a base plate. Advantages of this configuration can also exist in view of "parasitic lasing." The greater length of the active laser material 1 is something of a drawback.

If the total unfolded length of the resonator can be kept short enough, a further total internal reflection of the laser beam in the active laser material would also be conceivable and possible in principle.

Figure 6:
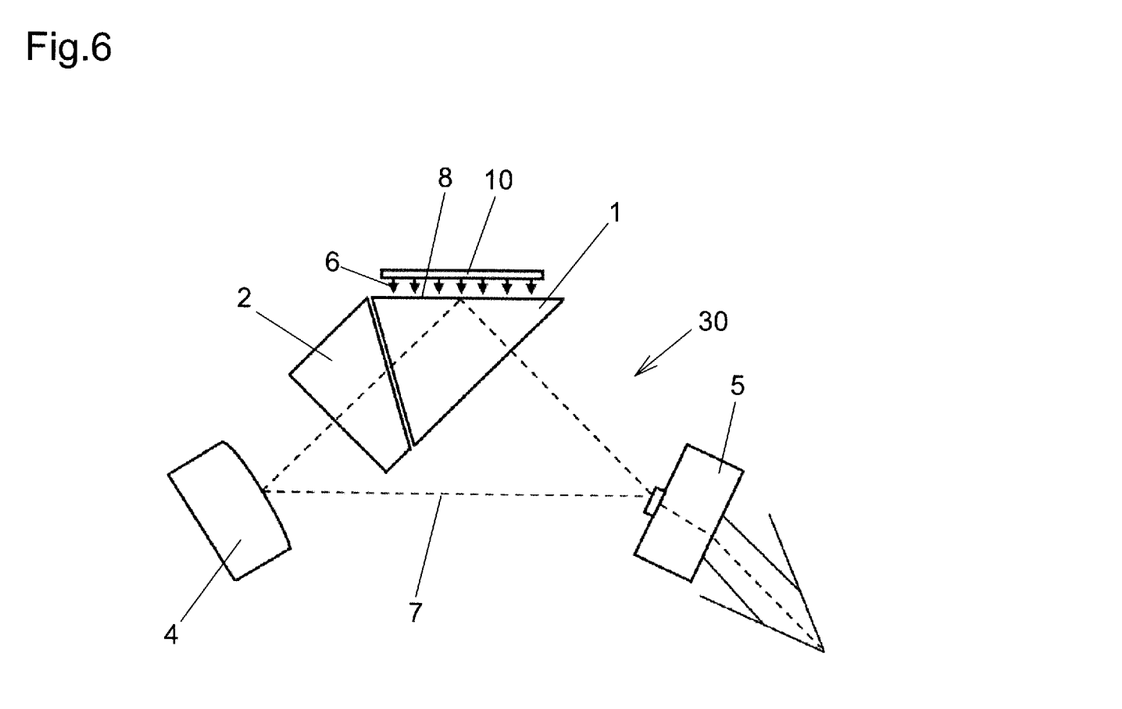
FIG. 6 shows a sixth exemplary embodiment according to the invention.

FIG. 6 shows a sixth exemplary embodiment of the invention. In this exemplary embodiment, the resonator 30 is designed as a ring resonator. In ring resonators, possible modes circulate in the resonator. The mirrors 4, 5 in this case are not "end mirrors." In the exemplary embodiment of the ring resonator shown, the ring structure is formed by the two mirrors 4, 5 together with a total internal reflection in the active laser material 1. Consequently, the ring structure is here substantially "triangular." Further reflections at reflective elements are conceivable and possible, for example to form a substantially "rectangular" ring structure. The second mirror 5 is again a gradient mirror. The latter can be configured analogously to the previously described exemplary embodiments.

The first mirror 4 is again configured to be an optical element having a negative refractive power. The focal length can lie in the region of −100 mm, for example.

The resonator 30 is optically unstable, wherein the magnification is greater than 1.2, for example can be approximately 2.

The active laser material is preferably again Nd:YAG.

The absorber 2 serves for passive Q-switching, with the absorber being a doped solid-state material, in particular Cr:YAG.

Analogously to the previously described second exemplary embodiment, the active laser material 1 and the absorber 2 are configured in a "flat-Brewster" configuration. The corresponding description for the second exemplary embodiment can be used here analogously.

Since the resonator 30 is a ring resonator, the entire refractive power of the resonator is here obtained by addition of all the optical elements for one round-trip in the resonator. Each optical element of the resonator 30 and its refractive power is thus included once.

The total refractive power of the resonator in this exemplary embodiment corresponds substantially to the refractive power of the first mirror 4, because the refractive power of the thermal lens by contrast is significantly lower. For example, the total refractive power of the resonator can range from −5 dpt to −10 dpt.

The resonator length is the length measured along the axis 7 of the laser beam in the resonator 30 through one round-trip through the resonator, that is to say, for example, in the exemplary embodiment starting from the first mirror 4 via the total internal reflection at the side face 8 of the active laser material 1 to the second mirror 5 and from there back to the first mirror 4. This resonator length is less than 100 mm, preferably less than 50 mm. The resonator length is here tuned such that at least substantially only one longitudinal mode oscillates (i.e. the energy of other longitudinal modes is less than 10%, preferably less than 1%, of that of the mode located in the gain maximum), in particular other longitudinal modes do not oscillate at all (i.e. the laser threshold for them is not exceeded).

The laser during operation again also has at least substantially only one transverse mode.

The side-pumping of the active laser material is effected analogously to the third exemplary embodiment, and the relevant description can be used.

It is likewise possible to support the polarization selection by way of the phase shift between the s-polarization and the p-polarization in the total internal reflection at the side face 8 of the active laser material 1 analogously to the third exemplary embodiment.

It is conceivable and possible even in the case of a ring resonator to dispense with the Brewster faces of the active laser material 1 and of the absorber 2 and to perform polarization selection exclusively using the phase shift of the total internal reflection. A polarization selection could also be dispensed with in principle.

Different further modifications of the exemplary embodiments shown are conceivable and possible without departing from the scope of the invention.

For example, pumping could also be effected through the second mirror 5, if it is designed such that it sufficiently transmits the pumped light. The arrangement of the first and the second mirror 4, 5 could also be swapped.

For the polarization selection of the laser light, angles other than the Brewster angle could be used, for example angles of 45°. It is also possible here to bond different parts with a dielectric layer located therebetween.

The polarization selection could also be performed in a different manner than shown, for example including by way of a grating structure applied on or introduced in a coating of an optical element of the resonator. Various ways of polarization selections of the laser light are known. It would also be conceivable and possible to entirely dispense with a polarization selection.

Instead of designing the first mirror 4 with a negative refractive power, or in addition thereto, a different optical element having a negative refractive power could be provided.

Instead of Nd:YAG, e.g. Yb:YAG, Er:YAG, . . . could also be used as active laser material. Nd:YAG could also be operated at a different wavelength than the dominant wavelength of 1064 nm, e.g. at 1440 nm.

Different saturable absorber materials can be used for the absorber, e.g. Co:MALO (for wavelengths greater than 1.2 µm), possibly in connection with Nd:YAG, which is operated at the side line of 1440 nm.

LEGEND FOR THE REFERENCE NUMERALS

1 Active laser material
2 Absorber
3 Resonator
4 First mirror
5 Second mirror
6 Pumped radiation
7 Axis
8 Side face
9 Side face
10 Laser diode stack
30 Resonator

The invention claimed is:

1. A Q-switched solid-state laser comprising a resonator (3, 30) formed as a linear resonator or a ring resonator having an active laser material (1) and at least one first and one second mirror (4, 5) and a resonator length (a) of less than 50 mm in case of the linear resonator and of less than 100 mm in case of the ring resonator, with at least substantially only one longitudinal mode oscillating in the resonator (3), wherein the resonator (3, 30) is an unstable resonator, with one of the first or second mirrors (4, 5) being a gradient mirror, wherein a total refractive power of the resonator (3, 30), which is obtained, in the case of the linear resonator (3), from a sum of refractive powers of optical elements of the resonator (3) over a path in one direction and a return path of the resonator (3) and, in the case of the ring resonator, from a sum of refractive powers of optical elements of the resonator (30) through a round-trip around the resonator (30), is less than −2 diopter, and wherein an absolute value of a refractive power of a thermal lens that is formed by the active laser material (1) during operation is less than 10% of an absolute value of the total refractive power of the resonator (3, 30).

2. The solid-state laser as claimed in claim 1, wherein the resonator (3, 30) has a magnification of more than 1.2.

3. The solid-state laser as claimed in claim 1, wherein the active laser material (1) is side-pumped.

4. The solid-state laser as claimed in claim 3, wherein a total internal reflection of the laser beam occurs at a side face (8) of the active laser material (1) through which pumped radiation (6) is injected, resulting in a phase shift between an s-polarization and a p-polarization of the laser beam.

5. The solid-state laser as claimed in claim 1, wherein the active laser material (1) is Nd:YAG.

6. The solid-state laser as claimed in claim 1, wherein the laser has a doped solid-state material as an absorber (2).

7. The solid-state laser as claimed in claim 6, wherein the doped solid-state material is Cr:YAG.

8. The solid-state laser as claimed in claim 1, wherein a pulse energy of the laser is at least 1 mJ.

9. The solid-state laser as claimed in claim 1, wherein a pulse duration of the laser is shorter than 20 ns.

10. A Q-switched solid-state laser comprising a resonator (3, 30) formed as a linear resonator or a ring resonator having an active laser material (1) and at least one first and one second mirror (4, 5) and a resonator length (a) of less than 50 mm in case of the linear resonator and of less than 100 mm in case of the ring resonator, with at least substantially only one longitudinal mode oscillating in the resonator (3), wherein the resonator (3, 30) is an unstable resonator, with one of the first or second mirrors (4, 5) being a gradient mirror, wherein the active laser material (1) is side-pumped, wherein a total internal reflection of the laser beam occurs at a side face (8) of the active laser material (1) through which pumped radiation (6) is injected, resulting in a phase shift between an s-polarization and a p-polarization of the laser beam, and wherein the resonator length (a) is tuned such that one of the phase-shifted s-polarization and p-polarization lies at a gain maximum of the active laser material (1) and an other one of said polarizations is shifted with respect to the gain maximum to an extent such that the oscillation thereof is prevented.

11. The solid-state laser as claimed in claim 10, wherein the active laser material (1) is Nd:YAG.

12. The solid-state laser as claimed in claim 10, wherein the laser has a doped solid-state material as an absorber (2).

13. The solid-state laser as claimed in claim 12, wherein the doped solid-state material is Cr:YAG.

14. The solid-state laser as claimed in claim 10, wherein a pulse energy of the laser is at least 1 mJ.

15. The solid-state laser as claimed in claim 10, wherein a pulse duration of the laser is shorter than 20 ns.

\* \* \* \* \*